Jan. 9, 1934.    F. M. POTTER ET AL    1,943,087
ELECTRICAL CABLE AND METHOD OF MANUFACTURE
Filed May 25, 1933    2 Sheets-Sheet 1
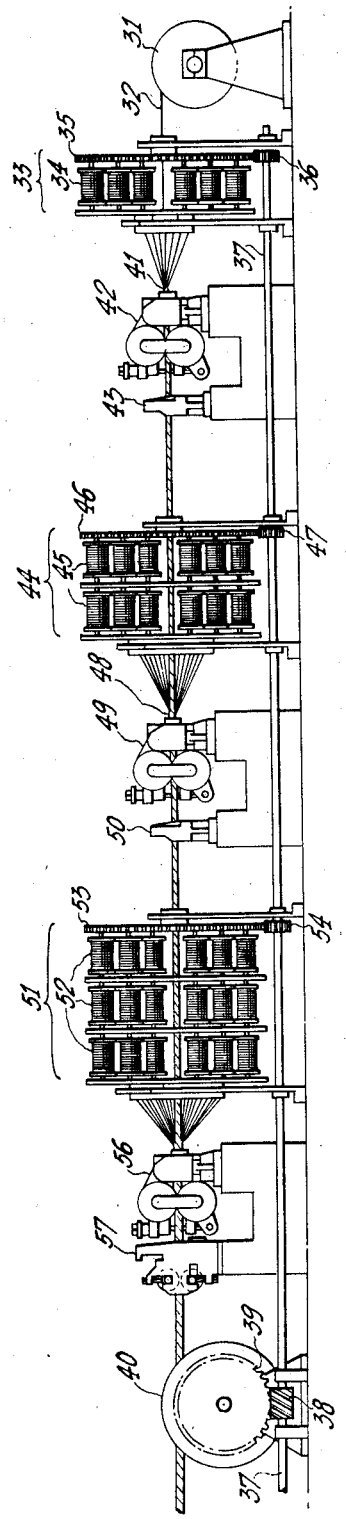
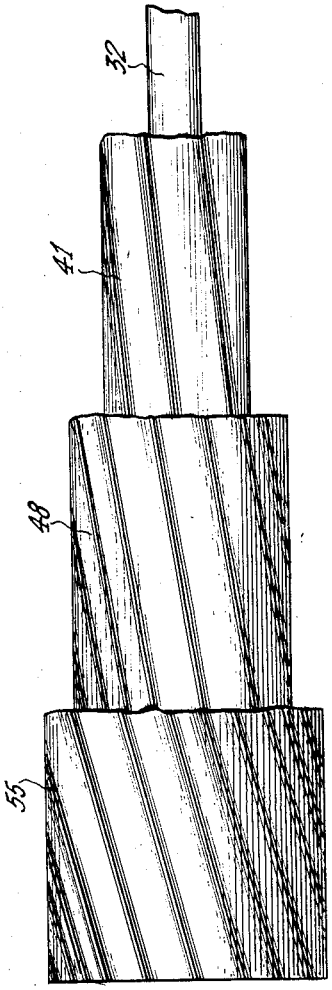
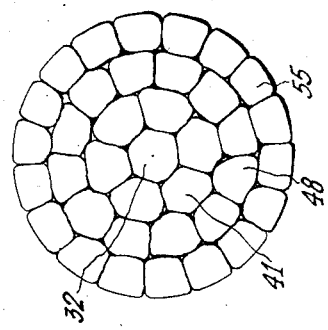
INVENTORS.
Frank M. Potter.
Edgar W. McKnight.
BY
ATTORNEYS.

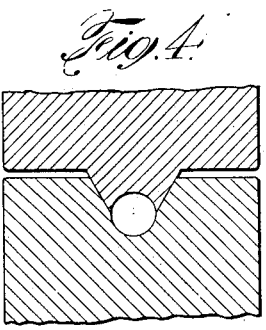
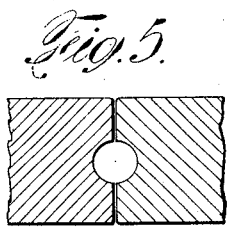
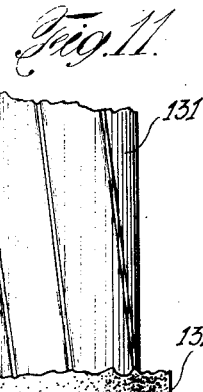
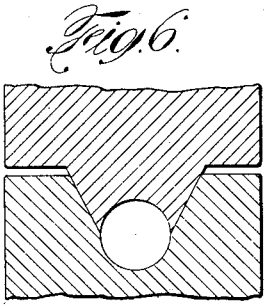
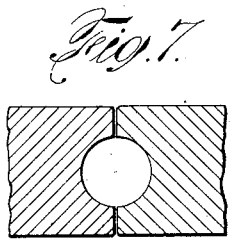
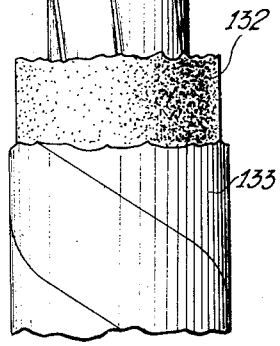
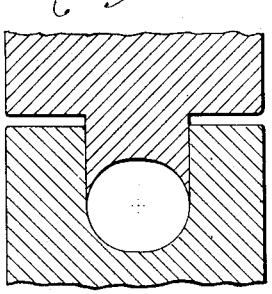
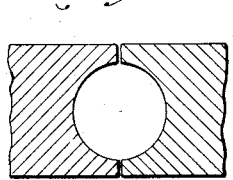
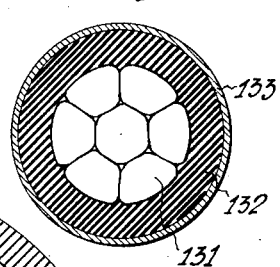
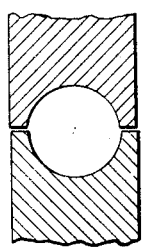
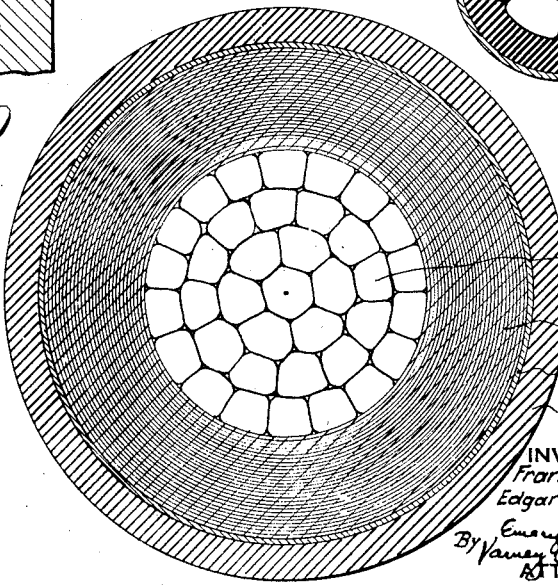

Patented Jan. 9, 1934

1,943,087

UNITED STATES PATENT OFFICE 1,943,087

ELECTRICAL CABLE AND METHOD OF MANUFACTURE

Frank M. Potter, Rome, N. Y., and Edgar W. McKnight, Bayonne, N. J., assignors to General Cable Corporation, New York, N. Y., a corporation of New Jersey Application May 25, 1933. Serial No. 672,860

18 Claims. (Cl. 173—264)

This invention relates generally to bare and insulated electrical conductors, and more particularly to stranded conductors, commonly called cables, and to the method of manufacturing the stranded conductors.

It is an object of the invention to produce by commercially practicable means a stranded conductor having a volume efficiency approaching 100% and also having an improved ability to bend with a minimum of distortion and enlargement. It is also an object of the invention to provide a stranded conductor of improved electrical performance for any given cross sectional area of conductor. It is a further object of the invention to provide an insulated stranded conductor wherein the outside diameter and the volume of insulating, sheathing and armoring materials required for any given service are appreciably reduced. Other objects and advantages of the invention will appear hereinafter.

This invention is the result of extensive research and development work in connection with the improvement of the mechanical and electrical characteristics of stranded cables used for the transmission of electrical energy. For convenience in this description the invention will be described with particular reference to stranded round electrical conductors, and the scope of the invention will be more particularly pointed out in the appended claims.

This application describes and claims a development of the invention disclosed in the Edgar W. McKnight application entitled "Electrical cable and method of manufacture", filed July 2, 1932, Serial No. 620,607. The McKnight application discloses an improved stranded, electrical conductor having a smoothly formed outer surface, as well as a method of manufacturing such conductors. The McKnight invention is described with particular reference to sector conductors, and while the broad principles disclosed and claimed in that application are applicable to the manufacture of conductors of other shapes, we have found that certain additional problems are involved in the manufacture of round conductors. The solutions of these problems are set forth in the present application, and in some instances have resulted in improvements applicable to conductors of shapes other than round, as may be ascertained from the claims.

Stranded round cables are extensively used in the transmission of electrical energy. Commonly these cables are concentric-lay cables, that is, they comprise a plurality of round wires arranged in overlying helical layers about a longitudinally extending central wire or core of wires. Standard concentric-lay cable practice in the United States requires that all of the wires be of the same size, that the first layer comprise six wires stranded about a single wire core, and that each overlying layer have six more wires than the layer immediately under it.

Heretofore in the manufacture of stranded wire cables having a plurality of overlying layers of helically arranged wires it has been necessary to have the wires in adjacent layers extend in opposite helical directions so as to prevent some of the wires of one layer dropping into the valleys between the wires of the underlying layer. Only by arranging the wires in adjacent layers in opposite directions has it been possible to make a cable having a uniform outer surface.

Cables are stranded primarily to provide the requisite flexibility as compared with a solid rod having the same metal cross-section. In stranded cable the spaces between the wires reduce the volume efficiency or ratio of actual metal cross-section to total cross-section. In other words, for the same metal cross-section or conductor size a stranded cable will have a larger over-all diameter than a solid conductor. Therefore considerably greater quantities of insulating, sheathing and armoring materials have been required for a stranded conductor than for a solid conductor for any given service.

When a concentric-lay stranded wire cable is bent the circular section is deformed and there is an increase in the periphery and a further reduction in the volume efficiency of the cable at the bend. Also there is a distortion or variation in the evenness of the cable surface caused by some of the outer wires either pushing out or pulling in more than the adjacent wires in the same layer. If the bending of the cable is continued this enlargement and distortion may become very pronounced and result in a bulging or spreading apart of the strands which is commonly known as "basketing" or "bird-caging". Then if the cable is straightened it may be found that some of the wires have been permanently deformed, and the cable will not resume its original size and shape.

The enlargement of ordinary or standard cable upon bending tends to make the wires spread apart, thereby incresing the size of the unfilled spaces between the cable surface and the overlying insulation and placing the insulation under great physical stress. This condition is greatly aggravated by the fact that in cables heretofore available the stresses in the wires upon bending the cable are not distributed evenly in all of the wires or uniformly along any one wire throughout the extent of the bend.

In insulated electrical cables which have stranded wire conductors there exist relatively small spaces between the surface of the stranded cable and the surface of the overlying insulation which are subject to ionization.

It is believed that if these ionizable spaces between the cable and the overlying insulation could be eliminated, the problem of internal corona or ionization damage would cease to exist. This theory is borne out by the fact that the problem does not exist for single wire conductors covered with rubber. Furthermore, it is well known that there is greater danger of corona formation at a sharp edge or on an uneven surface than there is on a smooth evenly rounded surface.

It has been recognized in the past that an ideal stranded cable would be one which would have no interstrand spaces, and which would have a minimum of distortion in size and shape upon bending. For convenience in the description of our invention we will use the term "bendability" to describe the ability of a stranded cable to bend with a minimum of distortion and enlargement.

It has been proposed heretofore to eliminate the interstices between wires of a cable stranded from round wires by drawing the stranded cable through a die. The fact that it has not come into common use, and our experience indicate that this procedure is impracticable if not wholly impossible of operation in commercial practice.

It has also been suggested that by swaging or hammering a cable stranded from round wires the spaces between the wires might be reduced or eliminated. When concentric-lay cable is hammered or swaged the wires in the several layers are badly deformed where they cross the wires in an adjacent layer, and adjacent layers become mortised or locked together, thereby greatly reducing the flexibility of the cable and at the same time making it impossible to bend the cable without excessive distortion in size and shape. Furthermore, this deformation of the individual strands comprising the cable reduces the effective cross-sectional area of each strand as well as appreciably hardening the copper, and therefore increases the resistance of the cable to the flow of electrical currents, and further reduces its flexibility.

Where stranded cables of other than round section have been required, for example sector conductors, a rolling operation has been introduced during the fabrication of the conductor for the purpose of attaining the desired shape. In some cases of sector-shaped cables the pressure on the rolls has been sufficient to change the shape of some of the wires, but no appreciable reduction in the spaces between the wires throughout the cross section of the cable could be accomplished without the objectionable deforming of the wires and the interlocking of adjacent layers as in the case of hammering.

Others have proposed to reduce or eliminate the interstices between wires in a stranded cable by individually preforming the wires so that when they are laid up together there will be no spaces between, at least theoretically. If such a cable can be made it would be expensive and difficult to manufacture, and there would be an inherent tendency of the individual wires to twist out of position. Furthermore, it would be impracticable if not impossible to reach a volume efficiency approaching 100%.

So far as can be ascertained, commercial practice up to this time has been limited to hammering or rolling the cable primarily for the purpose of providing a desired external shape, any improvement in the volume efficiency of the cable being incidental and very definitely limited by the pronounced increase in distortion of the cable on bending, and by the increase in electrical resistance.

We have produced a cable having a volume efficiency approaching 100%, and which at the same time has excellent bendability. Our cable has a uniform, substantially smooth outer surface on which there are no projecting sharp edges, and the individual wires are free from any tendency to twist or to spring out of position in the cable. Furthermore, we have developed a practicable method of producing this cable which does not unduly harden the metal and which may be used for tinned wires without impairing the tin coating. Cable made in accordance with our invention has a lower electrical resistance than any crushed stranded cable heretofore available.

The invention will be best understood from the following description when read in the light of the accompanying drawings of certain specific embodiments of the invention.

In the drawings:

Fig. 1 is a somewhat diagrammatic showing of apparatus for manufacturing a compact stranded cable;

Fig. 2 is an enlarged side elevation of a short length of thirty-seven strand round cable, the several layers of wires being progressively cut away to disclose the construction more clearly;

Fig. 3 is an end elevation of the cable of Fig. 2;

Figs. 4 to 10 are sections through the several sets of cable rolls perpendicular to the line of movement of the cable through the stranding machine;

Fig. 11 is an enlarged side elevation of a short length of insulated seven strand cable;

Fig. 12 is an end elevation of the cable of Fig. 11; and

Fig. 13 is an enlarged end elevation of a paper insulated, lead sheathed cable.

Referring first to Fig. 1, there is shown apparatus for the manufacture in accordance with this invention of a thirty-seven strand round cable having a high volume of efficiency, good bendability, and a uniformly smooth outer surface free from projecting ridges. At the right hand of Fig. 1 is a reel 31 containing a supply of wire 32 which serves as the center core for the cable. The wire 32 passes from the supply reel 31 to the left through the flyer 33 which wraps a layer of wires 41 helically around the core 32. The flyer 33 conveniently comprises spaced parallel disks which are suitably connected and mounted to rotate together, and between which are mounted a plurality of wire supply reels 34. In this illustrative embodiment there are six of the wire supply reels 34.

In operation the flyer 33 is rotated, as by means of a gear 35 on the outer periphery of one of the disks which meshes with a gear 36 rigidly secured on a main drive shaft 37 extending the full length of the apparatus. The shaft 37 may be driven by means of any suitable source of power (not shown). Conveniently this shaft is connected, for example through the worm 38 on the shaft 37 meshing with a worm gear 39 rigidly secured on a capstan 40 to drive the capstan which draws the cable through the apparatus.

As the flyer 33 rotates about the longitudinally moving wire 32 the wires 41 are drawn from the supply reels 34 and wrapped helically to form a layer about the core 32. From the flyer 33 the core, which now comprises seven strands, passes successively through the rolling units 42 and 43. In passing through the rolling unit 42 the seven strand core is rolled, conveniently in a vertical plane, to compress the strands together by changing the shape of the individual strands to more or less completely fill the interstrand spaces. These rolls give to the core a substantially round shape. A section showing the pass through the rolls of the unit 42, that is the opening between the rolls through which the core passes, is shown in Fig. 4. With rolls as shown in Fig. 4, slight ridges will be formed on the sides of the cable where the rolls meet. The rolling unit 43, whose pass through the rolls is round as shown in Fig. 5, and preferably of very slightly smaller diameter than the pass of the unit 42, desirably rolls the cable in a plane at an angle of 90° with the plane of the first rolling. The rolling unit 43 functions primarily as a side roll to roll down the small ridges on the two sides of the core as it emerges from the rolling unit 42.

From the rolling unit 43 the seven strand core passes through the flyer 44. In the showing of Fig. 1, the flyer 44 comprises three parallel spaced disks which are connected and mounted to rotate together. Between the spaced disks are mounted a plurality of wire supply reels 45. In the illustrative embodiment there are twelve of these wire supply reels. The flyer 44 is rotated, for example, by means of a gear 46 on the outer periphery of one of the disks which meshes with a gear 47 rigidly secured on the drive shaft 37. As the seven strand core passes through the flyer 44 a layer of wires 48 from the supply reels 45 will be laid about the core in the same general helical direction as the wires 41.

From the flyer 44, the core, now comprising nineteen strands, passes to a rolling unit 49 which may be generally similar in construction, except for the size of the roll pass, to the rolling unit 42. The unit 49 rolls the core, conveniently in a vertical plane to substantially round shape, the pass through the rolls desirably having a shape substantially as shown in Fig. 6. The rolling unit 49 compresses the strands together, changing the shape of the individual strands to more or less completely fill the interstrand spaces. After passing through the rolling unit 49 the core passes through a rolling unit 50 which may be generally similar in construction and function to the side rolling unit 43, and whose rolling pass is shown in Fig. 7.

From the rolling unit 50 the nineteen strand core passes through the flyer 51 comprising, in the showing of Fig. 1, four parallel spaced disks which are connected and mounted to rotate together. Between the spaced disks are mounted a plurality of wire supply reels 52. Conveniently the flyer 51 is rotated by means of a gear 53 on the outer periphery of one of the disks which meshes with a gear 54 on the drive shaft 37. In the illustrative embodiment there are eighteen of the wire supply reels 52, and as the flyer 51 rotates a layer of wires 55 will be laid about the core in the same general helical direction as the wires 41 and 48.

From the flyer 51 the thirty-seven strand core passes to a rolling unit 56 which may be generally similar in construction, except for the shape of the rolls, to the units 42 and 49. The unit 56 rolls the cable, conveniently in a vertical plane, but since this is the outer layer of wires for the cable of the illustrative embodiment, the cable desirably is rolled to a slightly out-of-round shape. The reasons for this will appear hereinafter. Fig. 8 shows the pass through the rolls of the unit 56.

From the rolling unit 56 the cable passes to a rolling unit 57. The rolling unit 57 preferably comprises two sets of rolls, the first set rolling the cable in a horizontal plane to slightly out of round shape, the pass through these rolls being as shown in Fig. 9, and the second or finishing set of rolls again rolling the cable in a vertical plane as shown in Fig. 10.

Conveniently the units 42, 49 and 56 differ from each other only in the size and shape of the cable guides and the rolls which define the passes through these units. These units roll the cable core in a vertical plane, and the passes through the rolls of the units 42, 49 and 56 are shown, respectively, in Figs. 4, 6 and 8.

We will now describe a particular stranded cable construction which illustrates the advantages of our compact cable as compared to cable heretofore available. A 500,000 circular mil (c. m.) standard concentric-lay copper cable comprises thirty-seven round wires each .1162 inches in diameter. Around a single wire core is a layer of six helically laid wires. Over this layer is a layer of twelve wires laid in the opposite helical direction. The outside layer of eighteen wires is laid in the same general helical direction as the six wire layer. The over-all diameter of this cable theoretically is seven times the diameter of one of the wires, or .8134 inches, and the figure given in the United States Bureau of Standards circular No. 31, October 1, 1914, is .814 inches.

A 500,000 c. m. compact cable made in accordance with our invention conveniently also comprises thirty-seven wires. The center wire 32 is initially a round wire having a diameter of .144 inches. Around the center wire are helically laid six wires 41 initially round and of the same diameter as the center wire. In some instances it may be advantageous to use wires slightly smaller than the center wire. This seven wire core having an over-all diameter of .432 inches passes successively through the rolling units 42 and 43 where it is compressed to a round shape having an over-all diameter of .390 inches.

The rolling unit 42 desirably accomplishes a majority of the compression of the wires, and gives to the seven wire core a cross sectional shape slightly out of round. The compressing of the seven wire core to a nearly round shape in one operation is desirable to minimize the working and hardening of the copper. We have found it possible to perform this step by using rolls of the shape shown in Fig. 4.

In practice it is difficult to make the edges of the compressing rolls of the unit 42 sufficiently sharp so that a very slight ridge will not be formed on each side of the cable where the rolls meet. The compressed core passes from the rolling unit 42 to the rolling unit 43, whose pass or roll opening is very slightly out of round, but at an angle of 90° relative to the unit 42. The rolls of the unit 43 roll down any slight ridges on the seven wire core, and further slightly compress the core to a round shape.

The seven wire core as it comes from the rolling unit 43 is uniformly round and has a substantially smooth outer surface. The spaces between the center wire and the surrounding wires have been almost completely filled by reason of the flow of the metal in all of the wires. A cross section through the seven wire core shows that the center wire now has a generally hexagonal shape, and that each of the surrounding wires has a substantially flat surface contact with the center wire and with each adjacent wire in the same layer. The outer surface is smooth except for the six helically extending valleys between the wires, which valleys are substantially uniform in width and depth along the length of the cable, and which are much shallower and narrower than before rolling.

Over the core as it comes from the rolling unit 43 a layer of twelve initially round wires 48 each having a diameter of .131 inches are laid in the same general helical direction as the wires in the six wire layer. This laying of the wires in the same helical direction is made possible by the fact that the seven wire core has a substantially smooth outer surface in which the valleys are so small that the wires 48 of the twelve wire layer can be laid smoothly in the same helical direction. Desirably the wires in the twelve wire layer are not laid exactly parallel to the wires in the underlying layer. This point will be discussed more fully hereinafter.

After the twelve wire layer has been applied to the core, increasing the outside diameter to .652 inches, the core passes successively through the rolling units 49 and 50 which compress the wires to a round shape having a diameter of .580 inches. The rolls of the unit 49, shown in Fig. 6, are similar to the rolls of the rolling unit 42, and roll the core to a slightly out of round shape. From the rolling unit 49 the cable passes to the rolling unit 50 and there through the side rolls shown in Fig. 7, these rolls serving to roll down the slight ridges which may have been formed in the rolling unit 49, and further slightly compress the core to a round shape.

The nineteen wire core as it comes from the rolling unit 50 is uniformly round and has a substantially smooth outer surface. The spaces between the surface of the six wire layer and the wires of the twelve wire layer have been almost completely filled by reason of the flow of the metal in the wires of the twelve wire layer. A cross section through the core at this stage in the process of manufacture shows that each wire in the twelve wire layer has a substantially flat surface contact with each adjacent wire in the same layer, and that the wires also have broad surface contacts with the wires of the underlying layer.

In a given cross section the wires in the twelve wire layer are not all of exactly the same shape, this variation being due to the flow of metal in those wires over the shallow valleys existing on the surface of the six wire layer into the valleys. This filling of the valleys on the surface of the underlying layer is not objectionable for the reason that the wires in both layers extend in the same general helical direction, and since the difference in the angles of lay in the two layers desirably is small, the change in cross sectional shape along any one wire is gradual, and there is substantially no variation in cross sectional area in any one strand.

Because of the fact that the wires in both layers extend in the same general helical direction, this flow of metal into the valleys on the surface of the six wire layer provides a long sliding contact and does not constitute an objectionable interlocking of the layers which will adversely affect the bendability of the cable. Possibly this slight longitudinal engagement of the strands in the two layers even improves the bendability of the cable by making it more difficult for any one strand to move from its position in the layer.

Around the core which emerges from the rolling unit 50 is stranded a layer of eighteen initially round wires 55 each .116 inches in diameter. This layer of wires comprises the outer layer of the cable here being described. All or none of the wires comprising the cable may be tinned, or only the wires of the outer layer may be tinned, as desired. On the outer layer of wires the process of rolling may be varied by using slightly different shaped rolls to insure against impairment of the tinned surfaces of the wires.

The core now having a diameter of .812 inches, passes through the rolling unit 56 in which the rolls desirably are shaped as shown in Fig. 8. It will be noted that these rolls differ from the rolls in the units 42 and 49 by having the edges of the groove in the lower roll vertical rather than inclined. Furthermore, the pass of these rolls desirably is shaped to compress the cable somewhat more out of round than in the case of units 42 and 49.

For example, the horizontal or major axis of the rolling pass may be .800 inches and the vertical or minor axis of this pass .710 inches. From the rolling unit 55 the slightly out-of-round core passes through the first set of rolls in the unit 57 which desirably again compress the cable slightly out of round, but this time with the major axis of the cross section at 90° to the major axis of the pass through the rolls shown in Fig. 8. For example, the pass through these rolls will have a vertical or major axis of .750 inches and a horizontal or minor axis of .730 inches. The cable then passes through the finishing rolls which form the cable slightly to the final round shape. As shown in Fig. 10, these rolls preferably are offset very slightly as this has been found desirable to insure an exactly round shape in which there is practically no inherent tendency in the individual wires to twist or turn out of their position in the cable. The finished cable has an overall diameter of .745 inches.

By compressing the final layer of wires in several steps to arrive at the desired overall diameter and shape the tinned surfaces on the outer wires are not impaired. Where a layer of wires is compressed in one rolling nearly to round shape and the side ridges then are rolled down, as in the six and twelve wire layers, these ridges are extremely small and have no adverse effect on the mechanical and electrical characteristics of the cable. We have found that in rolling a layer of strands in the manner described by us for the eighteen wire layer no ridges are formed. Furthermore, it is possible to more completely fill in the valleys on the outer surface of the cable. The final cable has a uniformly round shape, and a substantially smooth outer surface. The very shallow valleys extending helically on the surface of the conductor are narrow, and are substantially uniform in cross section throughout the length of the cable.

It will be noted that the sum of the initial cross sectional areas of the wires which go to make up our 500,000 c. m. cable is considerably greater than 500,000 c. m. During the several rolling operations in the manufacture of the cable the wires are elongated as well as changed in cross sectional shape, so that in the finished cable the desired cross sectional area is arrived at. Compression of the overall diameter of each layer of wires when the rolling of that layer is completed with the overall diameter of the same layer in the completed cable indicates that as successive layers are applied and rolled the underlying core acts to some extent as a cushioning base, and that the underlying layer or layers, as the case may be, are further slightly compressed and elongated by the rolling of the overlying layers. In the illustrative embodiment different sized wires are used in the several layers. This has been done merely to permit the use of the same number of wires in each layer as in present standard practice.

The final overall diameter of our compact 500,000 c. m. cable is .745 inches as against .814 inches for standard concentric-lay cable of the same conductor size. The overall diameter of our compact cable is approximately 8½% less than that of the standard concentric-lay table.

Numerous lengths of 500,000 c. m. compact cable have been made in accordance with the method herein described, and in which the number and size of the wires and the size and shape of the rolls have remained the same, but in which the lengths or angles of lay of the wires in the several layers have been varied to produce slightly different constructions. These cables all have been tested for increase in diameter and surface distortion on bending, and the results demonstrate that some of the cables have much better bendability than others. All of the reasons for these variations are not fully understood at this time, but there appear to be certain governing factors which we will describe as we now understand them.

There are a number of fairly definite limitations to be considered in the design and manufacture of a commercially practicable stranded cable. For example, the angles of lay of the strands, that is the angles of the axes of the strands with respect to the longitudinal axis of the cable, cannot be indiscriminately increased because of the resultant increase in weight of the cable for a given effective conductor size as compared to a solid conductor. This is because an electric current, in passing through the cable, in general divides more or less equally between the wires and follows along parallel to the wires, and does not move from one wire to another in a path parallel to the cable axis. Present commercial practice has placed a limit of about 2% on the permissible increase in weight due to stranding. The angle of lay of the wires in any layer also is limited by the number of wires to go into the layer smoothly and without excessive spacing between wires. Also it is desirable to keep within certain limits on the angles of lay to facilitate handling of the core at the various stages during the manufacture of the cable.

Among the 500,000 c. m. compact cables actually made and tested by us, a cable having the following specifications seems most nearly to approach the commercially practicable ideal:

Length of lay 6 wire layer_____ 6.7 inches
Length of lay 12 wire layer_____ 9.5 inches
Length of lay 18 wire layer_____ 7.8 inches
Angle of lay 6 wire layer_____ 6.25°
Angle of lay 12 wire layer_____ 8.50°
Angle of lay 18 wire layer_____ 14.75°
Outer surface contact angle 6 wire layer__ 9.25°
Inner surface contact angle 12 wire layer__ 6.50°
Outer surface contact angle 12 wire layer__ 10.25°
Inner surface contact angle 18 wire layer__ 12.50°

The "length of lay" is the distance along the cable parallel to the cable axis which is required for a wire to make one complete turn about the cable axis. The "angle of lay" is the angle between the tangent to the longitudinal axis of one wire and the longitudinal axis of the cable, commonly known as the helix angle. It will be apparent that the angle of lay for any given length of lay is dependent on the radius or distance between the longitudinal axis of the cable and the longitudinal axis of the wire being considered, and that therefore the angles at the inner and outer surfaces of the wire where it contacts with adjacent layers will be different from each other and from the angle measured on the longitudinal axis of the wire. The "surface contact angles" are measurements of these angles on the inner and outer surfaces of the wires, and by comparing the outer contact angle of a wire in one layer with the inner contact angle of a wire in the immediately overlying layer it is possible to arrive at a figure which represents the actual angular crossing of one wire over the other at their contacting surfaces.

The particular cable just described has a 1.98% increase in weight due to the lay of the wires. This is satisfactorily within the present commercial limit. On bending around an eight inch diameter form this cable exhibits an increase in periphery of approximately 11% and a maximum surface distortion of about 2.6%, this latter being measured in terms of the distance by which one wire in the outer layer projects radially outwardly beyond an adjacent wire as compared to the over-all diameter before bending.

These figures may be compared with those of two similar sized standard concentric-lay cables made under somewhat different conditions. The standard concentric-lay cables have, respectively, 1.85% and 1.63% increase in weight due to the lay of the wires. The same cables when bent about an eight inch diameter form exhibit, respectively, increases in periphery of approximately 15% and 20%. The increases in surface distortion are, respectively, 9.5% and 14.5%.

A compact cable made in accordance with our invention and exhibiting somewhat better bendability characteristics than the illustrative example described above has the following specifications:

Length of lay 6 wire layer_____ 6.0 inches
Length of lay 12 wire layer_____ 8.4 inches
Length of lay 18 wire layer_____ 6.8 inches
Angle of lay 6 wire layer_____ 7.00°
Angle of lay 12 wire layer_____ 9.75°
Angle of lay 18 wire layer_____ 16.75°
Outer surface contact angle 6 wire layer___ 10.25°
Inner surface contact angle 12 wire layer__ 7.25°
Outer surface contact angle 12 wire layer__ 11.75°
Inner surface contact angle 18 wire layer__ 14.50°

This cable, when bent about an eight inch diameter form, shows an increase in periphery of only about 5.3% and an increase in surface distortion of about 1.3%. However, the increase in weight due to the lay of the wires is 2.64%, which is considerably above the present commercial limit.

Both of the rolled cables upon which detailed specifications have been given have volume efficiencies of over 92%, whereas, so far as we have been able to determine, no stranded cables heretofore commercially available have volume efficiencies greater than 84%, and many are much lower.

Figs. 11 and 12 show, by way of example and to enlarged scale, a seven strand cable 131 which has been rolled in accordance with this invention to substantially eliminate the spaces between the strands and to provide a uniformly round and substantially smooth outer surface. Enclosing the conductor is a wall 132 of plastic insulating material, for example a rubber compound. The insulation may be protected by suitable sheathing or armoring materials, a helical wrapping 133 of cloth tape being shown merely as illustrative.

Fig. 13 shows, merely by way of example and to enlarged scale, a paper insulated lead sheathed cable made in accordance with our invention and in which the conductor 134 is a 37 wire cable. Enclosing the conductor is a wall 135 of wrapped-on paper insulation which desirably is saturated with an insulating oil or compound. Over the insulation 35 is a thin metallic shielding layer 136, and enclosing the insulated and shielded conductor is the impervious sheath 137.

In cable made in accordance with our invention the spaces between the strands and the valleys on the outer surface of the cable are reduced in size to a minimum. This cable has a higher volume efficiency than any stranded cable heretofore available, and for a given size of conductor or metal cross section the over-all diameter of the cable is reduced so that it approaches that of a solid conductor. This means that appreciably less insulating, sheathing and armoring materials are required for any given conductor size and service. Furthermore, if the insulated conductor is filled with an insulating fluid or compound there will be a further saving of this material because of the much smaller spaces between the wires.

In addition to the actual saving in materials the insulated cable is more easily and economically transported and handled because of the reduced weight. If the cable is to be drawn into underground ducts smaller ducts may be employed, or alternatively larger conductor sizes may be used in existing ducts. If the insulated cable is used as an aerial cable there will be a smaller ice and wind load for a given conductor size.

The adjacent wires in any layer of standard cable have only tangential contact, and with any slight variation in the stress in two adjacent wires, caused by bending the cable, one of the wires may be pushed out or pulled in from its normal position in the layer at some point along the cable. As soon as one wire is displaced from its normal position in the layer it no longer is effective to help support the other wires and preserve the layer formation. It will be apparent that the existence of such a condition aggravates the uneven distribution of stress in the various wires, and further bending of the cable may result in localization of the bending stresses in one or more of the wires which will be evidenced by relatively sharp permanent bends.

We have found that the enlargement of the cable upon bending is greatly reduced and that the unevenness in the cable cross section resulting from bending is substantially eliminated by building the cable in layers and collectively working the strands in each layer in situ to provide broad surface contacts between adjacent strands and to provide a uniformly smooth outer surface on each layer before the overlying layer is applied. By replacing the tangential contacts between adjacent strands with broad surface contacts we arrive at a construction in which it is practically impossible during bending for any one strand to move entirely out of its supporting position relative to the other strands in the same layer. By preserving the layer construction each strand is firmly supported on two sides throughout its length, and the bending stresses are more evenly distributed, not only between the wires, but also in each wire throughout the extent of the bend.

We have found that in making cables according to our invention the wires in adjacent layers may be laid in opposite helical directions as has been the practice in the past. However, experimental data thus far obtained seems to indicate that the cable will have appreciably better bending characteristics if all of the wires extend in the same general helical direction. It is believed that where the wires in adjacent layers extend in opposite directions the rolling of the layers causes a slight interlocking or mortising together of the strands in adjacent layers which tends to increase the enlargement and distortion upon bending.

When all of the wires in the cable extend in the same general helical direction we have found that it is preferable not to have the wires in one layer following along exactly the same path as the wires of an adjacent layer at their contacting surfaces. Experimental data thus far obtained seems to indicate that this is particularly important for the two outside layers of wire.

It is believed that if the wires of one layer extend in an angular direction slightly different from the angular direction of the wires in the adjacent layer, these angular directions being measured at the contacting surfaces of the layers, the stress in any wire of one layer upon bending is not concentrated on one or at the most two wires in the adjacent layer, but is distributed over all of the wires in the adjacent layer. In other words, all of the stress on one wire is not effective to push one of the overlying wires out of its position in its layer, but rather is distributed tending to push all of the overlying wires out more or less equally.

Following the tests on numerous samples of thirty-seven wire, 500,000 c. m. cable made in accordance with our invention we plotted the increase in diameter of the cable upon bending about an eight inch diameter form against the angle of lay of the wires in the outer layer. The points so plotted lie in a fairly definite band, and the fact that we find a band rather than a line seems to indicate that the bendability also is affected, at least to some extent, by the lay of the wires in the other layers.

It is believed that if tests were made on numerous additional samples, a majority of which would be clearly outside the range of commercial practicability, either because of the increase in weight due to stranding, or for other reasons, this curve or band would take the form of a parabola or hyperbola which would indicate that the greater the angle of lay in the outside layer, the better the bendability. Our tests on samples of cable covering and extending slightly beyond the present commercial practicable range indicate a pronounced trend within that range to an angle for the outer layer of wires of about 21° as the best. Such an angle would increase the weight of the copper beyond present accepted limits, and would necessitate the use either of different sized, or a different number of wires in the layer.

Previously we have referred to a suggestion to make stranded cable by individually preforming each wire so that when wires are cabled together there will be no spaces between them. Even if such cable can be made, the twisting imposed upon each preformed wire as it is laid in place would give a cable in which each of the wires is under internal stress. As a result each wire would tend to twist about its longitudinal axis, thereby creating spaces between the strands within the cable and causing the sharp corners on the outer layer of strands to project above the theoretical cable surface. These sharp corners of the surface of the conductor would aggravate the formation of corona.

According to our invention the wires in any layer of the cable are permitted to take their position in the layer without being twisted as is necessary where the wires are preformed. After a layer of wires has been stranded in place, the layer is rolled under pressure which collectively works the wires and substantially eliminates all of the spaces between the wires. The cross section of any one wire will vary slightly and gradually in shape from point to point along its length to permit actual continuous surface contact with the adjacent wires. While the cross sectional shape of any wire does vary, the cross sectional area of each wire remains substantially constant throughout its length.

The rolling operation causes the metal in each wire to flow and each wire thus acquires a permanent set. As a result, the individual wires in our cable are not under physical stress tending to twist them out of position and create or enlarge the spaces between the wires, and the cable may be severed with practically no tendency of the wires to spread apart at the cable ends. Furthermore, if the wires should spread apart slightly at the cable end it is much easier to twist them together because they all are laid in the same general helical direction.

We have briefly mentioned the fact that when the metal comprising the wires of a stranded cable is caused to flow under pressure there will be a hardening of the metal. This working of the metal increases its resistance to the flow of electrical currents, and the amount of working must be kept within definite limits if the final product is to meet standard requirements as to flexibility and electrical resistance without the necessity of annealing the cable. We have developed a method of forming a stranded cable in which the wires are compressed into desired shape with a minimum of metal flow.

We have found that in cables where the outer layer of wires are tinned, special precautions must be taken during the rolling operation to preserve the thin coating of tin. We have produced a cable in which initially round wires coated with tin can be compressed so as to substantially eliminate all of the interwire space without impairing the tin coating on the individual wires.

Cable made in accordance with our invention not only has greatly reduced spaces between the wires on the interior of the conductor, but also has valleys between the wires on the outer surface of the cable which are much reduced in size and depth. The cable surface is uniformly round, and in smoothness approaches that of a solid conductor. There are no projecting sharp ridges and the valleys are much shallower than in stranded conductors heretofore available. Such a construction permits more uniform and accurate application of insulating material about the conductor, and these facts, plus the fact that our cable has better bendability, largely eliminate the danger of ionization between the conductor surface and the overlying insulation, and increase the breakdown strength. Furthermore, the dielectric losses will be reduced because of the smaller quantity of insulating material.

When direct current flows in a conductor there is a loss of power proportional to the resistance of the conductor to the flow of current. The resistance to flow of direct current offered by a stranded conductor in which each strand has a uniform size and shape throughout its length is substantially equal to the resistance that the same strands would have if individually insulated and connected in parallel. The current tends to follow the individual strands because of the contact resistance between strands, and there is substantially no transfer of current from one strand to an adjacent strand along the cable. As a result, the resistance of a stranded cable is dependent on the variation in cross sectional area of the individual strands longitudinally of the cable, and to a lesser extent on the variation in shape of the individual strands longitudinally of the cable.

If the variation in shape is gradual it has very little effect on the resistance of a strand. However, variation in the cross sectional area of a strand along its length reduces the effective conductor size and increases the electrical resistance. The resistance of any wire whose cross sectional area varies is greater than that of a wire having a constant cross sectional area equal to the average cross sectional area of the former.

In standard concentric-lay cable the wires in each layer cross the wires in adjacent layers at short intervals and at angles of usually about 20° or 30°. If such cable is crushed, regardless of the method employed for crushing, the wires of one layer tend to cut through the wires of adjacent layers, and each wire will have a cross section which varies continuously and abruptly along its length both in size and shape. As a result the resistance of the crushed cable to the flow of direct current will be increased by the crushing appreciably more than if the wires were merely elongated without irregular distortion. The extra copper or other metal in the form of bulges between the smaller sections in any wire is less effective than if it were uniformly disposed along the length, thus resulting in a higher resistance per unit length for a given weight and cost of the cable than if the wires were uniform in area.

When alternating current flows in a conductor there is also loss in power, but in general this loss is greater for alternating current than it is for an equal direct current, and this is particularly true in multiple conductor cable. In other words, the resistance of the conductor apparently is greater for alternating current than it is for direct current. This increase in resistance to the flow of alternating current is dependent on "skin" effect and on "proximity" effect.

Skin effect is defined in terms of the characteristics of an isolated conductor, and denotes the increase in resistance caused by the crowding of the alternating current toward the surface of the conductor. Proximity effect denotes the increase in resistance of a conductor resulting from distortion of the current distribution over the conductor cross-section caused by the flow of current in nearby conductors. Skin and proximity effect mutually modify one another, and the expression "skin-proximity effect ratio" is commonly used to denote the ratio of the alternating current resistance to the direct current resistance. This ratio is then a direct measure of the increase in power loss when alternating current is used.

Obviously, it is desirable to have the skin-proximity effect ratio as low as possible. By stranding the wires in a conductor all in the same general helical direction we obtain a conductor having a greatly reduced skin-proximity effect ratio.

It is believed that it will be apparent from the foregoing description that our solution of the problem of designing and supplying in a commercially practicable manner a mechanically and electrically satisfactory, compact stranded conductor constitutes a material and important advance in the art. It will be understood that the present invention may be variously modified and embodied within the scope of the subjoined claims.

We claim:

1. A stranded electrical power cable comprising a core and a plurality of overlying conducting layers, each layer comprising a plurality of helically arranged strands having a substantially smooth outer surface free from projecting ridges, in which all of the strands are laid in the same general helical direction and in which the contact angle of lay of the strands in each layer differs from the contact angle of lay of the strands in an adjacent layer at the contacting surfaces.

2. A stranded electrical power cable comprising a core and a plurality of overlying conducting layers, each layer comprising a plurality of helically arranged strands having a substantially smooth outer surface free from projecting ridges, in which all of the strands are laid in the same general helical direction and in which the inner contact angle of lay of the strands in the outer layer differs from the outer contact angle of lay of the strands in the immediately underlying layer.

3. A stranded electrical power cable comprising a core and a plurality of overlying conducting layers, each layer comprising a plurality of helically arranged strands having a substantially smooth outer surface free from projecting ridges, in which all of the strands are laid in the same general helical direction and in which the inner contact angle of lay of the strands in the outer layer is greater than the outer contact angle of lay of the strands in the immediately underlying layer.

4. A stranded electrical power cable comprising a core and a plurality of overlying conducting layers, each layer comprising a plurality of helically arranged strands having a substantially smooth outer surface free from projecting ridges, in which all of the strands are laid in the same general helical direction and in which the angles of lay of the strands in the several layers of the cable progressively increase from the inner layer outwardly.

5. A stranded electrical cable comprising a core and a plurality of overlying conducting layers, each layer comprising a plurality of helically arranged strands having a substantially smooth outer surface free from projecting ridges, in which all of the strands are laid in the same general helical direction and in which the contact angle of lay of the strands in one layer differs from the contact angle of lay of the strands in an adjacent layer at the contacting surfaces of the layers.

6. A stranded electrical cable comprising a core and a plurality of overlying layers of helically arranged strands in which all of the strands are laid in the same general helical direction and in which the contact angle of lay of the strands in each layer differs from the contact angle of lay of the strands in an adjacent layer at the contacting surfaces of the layers, the strands of each layer having been individually drawn and collectively rolled layer by layer in situ to reduce the interstices between the strands and to provide the layer with a smoothly rounded outer surface.

7. A stranded, round electrical cable comprising a core and a plurality of overlying conducting layers, each layer comprising a plurality of helically arranged strands initially of such shape that deep valleys exist on the layer surfaces, the strands having been rolled layer by layer in situ to reduce the interstices between the strands and provide each layer with a substantially smooth outer surface free from deep valleys before the overlying layer is applied, each rolled strand having in any cross section of the cable a non-circular shape which varies slightly and gradually longitudinally of the cable depending upon the surface of the underlying layer and the side surfaces of the adjacent strands in the same layer, and each such strand having a substantially constant cross sectional area throughout its length.

8. A stranded, round electrical cable without substantial interstrand spaces and having a relatively high volume efficiency, comprising a central core strand and a plurality of concentric conducting layers each comprising a plurality of strands, the core strand and each strand of each layer comprising an initially round wire, all of said wires having been deformed by rolling layer by layer in situ to provide each layer with a substantially smooth outer surface free from projecting ridges, the deformation varying throughout the length of each strand and conforming at any given cross section of the cable to the deformation of adjacent contacting strands.

9. A stranded, round electrical cable without substantial interstrand spaces and having a relatively high volume efficiency, comprising a central core strand and a plurality of concentric conducting layers each comprising a plurality of strands, the core strand and each strand of each layer comprising a wire deformed in place by radial pressure applied successively to the layers, layer by layer over the whole surface thereof, to provide each layer with a substantially smooth outer surface free from projecting ridges, the deformation varying throughout the length of the strand and conforming at any given cross section of the cable to the deformation of adjacent contacting strands.

10. A stranded, round electrical cable comprising a core and a plurality of overlying conducting layers each of which comprises a plurality of helically arranged wires initially of such shape that deep valleys exist on the layer surfaces, the wires having been compressed layer by layer in situ to reduce the inter-wire spaces and provide each layer with a substantially smooth outer surface free from deep valleys before the overlying layer is applied.

11. An electrical power cable comprising, in combination, a stranded conductor having a core and a plurality of overlying conducting layers, each layer comprising a plurality of helically arranged strands having a substantially smooth outer surface free from deep valleys, all of said strands being laid in the same general helical direction with the contact angle of lay of the strands in one layer differing from the contact angle of lay of the strands in an adjacent layer at their contacting surfaces, an envelope of insulation enclosing the conductor, and a sheath surrounding the insulated conductor.

12. An electrical power cable comprising, in combination, a stranded conductor having a core and a plurality of overlying conducting layers, each layer comprising a plurality of helically arranged strands having a substantially smooth outer surface free from deep valleys, all of said strands being laid in the same general helical direction with the inner contact angle of lay of the strands in the outer layer differing from the outer contact angle of lay of the strands in the immediately underlying layer, an envelope of insulation enclosing the conductor, and a sheath surrounding the insulated conductor.

13. An electrical power cable comprising, in combination, a stranded conductor having a core and a plurality of overlying conducting layers, each layer comprising a plurality of helically arranged strands having a substantially smooth outer surface free from deep valleys, all of said strands being laid in the same general helical direction with the inner contact angle of lay of the strands in the outer layer being greater than the outer contact angle of lay of the strands in the immediately underlying layer, an envelope of insulation enclosing the conductor, and a sheath surrounding the insulated conductor.

14. A round electrical power cable comprising, in combination, a stranded conductor having a volume efficiency approaching 100%, said conductor comprising a plurality of overlying conducting layers each composed of a plurality of helically arranged strands initially having shapes such that deep valleys exist on the outer surfaces of the layers, the strands having been rolled layer by layer in situ to reduce the inter-strand spaces and to provide each layer with a smoothly rounded surface free from deep valleys, an envelope of insulation enclosing the conductor, and a sheath surrounding the insulated conductor.

15. The method of manufacturing a stranded, round electrical conductor from wires initially having shapes such that deep valleys would exist on the outer surface of the conductor, which method comprises rolling the stranded conductor under pressure sufficient to cause the metal in the wires to flow and substantially fill the spaces initially existing between the wires, said rolling pressure being applied in such a manner that the conductor is compressed slightly out-of-round, releasing the pressure on the stranded conductor thereby permitting it to spring back slightly toward a round shape, rolling the conductor in a plane substantially at right angles to the plane of the first rolling under pressure sufficient to roll the conductor very slightly out-of-round in a direction at right angles to that of the first rolling and to further fill the spaces existing between the wires, releasing the pressure on the stranded conductor thereby permitting it to spring back nearly to a round shape, and then rolling the conductor under pressure in substantially the same plane as the first rolling to give to the finished conductor a substantially round shape, but without substantial further reduction in the spaces between wires.

16. The method of manufacturing a stranded, round electrical conductor comprising a core and an overlying layer of helically laid wires, said wires initially having shapes such that deep valleys exist on the surface of the layer and being coated with a thin layer of another metal, which method comprises stranding the coated wires around the core, rolling the conductor under pressure to compress the conductor slightly out-of-round and cause the metal in the wires to flow smoothly and substantially fill the deep valleys initially existing between the wires, releasing the pressure on the conductor thereby permitting it to spring back slightly toward its original round shape, rolling the conductor under pressure in a plane substantially at right angles to the plane of the first rolling to compress the conductor slightly out-of-round in a direction at right angles to that of the first rolling and further fill the valleys between wires, releasing the pressure on the conductor thereby permitting it to spring back slightly toward the round shape, and then rolling the conductor under pressure in substantially the same plane as the first rolling to give to the finished conductor without substantial further reduction in the valley spaces the desired round shape and a smoothly formed outer surface, all while maintaining unbroken the coated surfaces of the wires.

17. The method of manufacturing a stranded, round electrical cable which comprises forming a core by assembling a plurality of wires initially having shapes such that deep valleys and projecting ridges exist on the surface of the core, collectively compacting the assembled wires by rolling pressure applied around the entire circumference thereof to materially alter the cross sections of the individual wires and reduce the interwire spaces, applying to this compacted core a layer of wires initially having shapes such that deep valleys and projecting ridges exist on the outer surface of the layer, and collectively compacting the wires of said layer by rolling pressure applied around the entire circumference of the assembled wires to materially alter the cross sections of the individual wires and reduce the inter-wire spaces, and to provide a uniformly rounded outer surface free from projecting ridges.

18. The method of manufacturing a stranded, round electrical cable which comprises stranding a plurality of wires together to form an inner core, said wires initially having shapes such that projecting ridges exist on the core surface, rolling the core under pressure to compact and materially alter the shapes of the wires and provide a smooth and substantially round outer surface free from projecting ridges, stranding over the compacted core a layer of wires initially having shapes such that projecting ridges exist on the outer surface of the layer, and rolling this overlying layer of wires to compact them and materially alter their shapes to provide a uniformly smooth outer surface free from projecting ridges.

FRANK M. POTTER.
EDGAR W. McKNIGHT.